Patented Oct. 25, 1938

2,134,060

UNITED STATES PATENT OFFICE 2,134,060

METHOD OF PRESERVING FRUITS

Ralph E. Schaefle, Berkeley, Calif., assignor to Balfour, Guthrie & Co., Limited, San Francisco, Calif., a corporation of Delaware No Drawing. Application May 11, 1938, Serial No. 207,309

2 Claims. (Cl. 99—104)

This invention relates to a method for preserving fruits, especially prunes and like dried products, the main purpose of the invention being to provide a method which lends itself to practice on a commercial scale and which results in a preservation enhancing of the natural taste, appearance and quality of the product treated.

By the ordinary method of preparing prunes for the table, the prunes are cooked, i. e. boiled, in water to cause the prunes to swell and soften. This results in a diffusion of the water into the bodies of the prunes, and at a very rapid rate, causing the prunes to swell and often burst. Furthermore, it leaches out the sugar and destroys much of the original prune flavor, and results in actual deterioration of the prunes.

Actual tests show that a dried commercial prune contains about 25% sugar and about the same amount of moisture. The completed product obtained by the method of preserving here described contains about 46% moisture, and the sugar content is maintained at about the same ratio.

In accordance with the present invention, one object is the preservation of the prune by the incorporation of sugar in substantially the same proportion as that found in the original dried prune, so as to retain as unaltered as possible the original and characteristic sweet, prune flavor. While moisture is at the same time introduced, the prunes are not cooked or boiled but are subjected to a sufficiently high and regulated temperature for an adequate period of time to insure a skin and pulp of desired tenderness. Thereafter the prunes are drained of excess syrup and made ready for the market.

More specifically, by this new process, the dried prunes are first processed by dipping them in hot water for about four minutes. This is merely a cleansing operation and effects little if any change in the physical structure of the prune itself.

The prunes are next removed and drained, and while hot are placed in a kettle containing a syrupy solution made from sugar and water, about half and half by weight, so as to produce a solution of about 50° Baumé. The kettle may be heated in any suitable manner, for instance by a steam jacket, and the temperature is so controlled as not to cook or boil the prunes. The syrup and the prunes placed therein are maintained in practice at a temperature of approximately 200° F. for about two hours. The steam is then turned off and the prunes are left in the syrup solution for an additional sixteen hours, approximately, during which time the temperature is allowed gradually to drop to approximately 160° F. The prunes are then removed and drained and are packed in cans, glass jars or other suitable containers, after which the containers are evacuated, sealed and finally subjected to a sterilizing temperature and thereafter cooled, when they are ready for the market.

Prunes preserved by the method herein described distinguish outstandingly from ordinary cooked or stewed prunes by being more tender, by having a better appearance, and by retaining their original flavor and sweetness and by being more palatable. The prunes are at no time subjected to a boiling temperature. Their heat treatment in the syrup solution at a maximum temperature of 200° F. and then graduated down to 160° for a considerable period of time brings about a structural change without depriving the prunes of any of their inherent virtues. While the prunes are tender and the flesh or meat is readily separated from the pits, they are at the same time sufficiently firm to prevent breaking up or becoming mushy during shipment.

On account of being subjected to a temperature below the boiling point of water, the prunes do not have the burnt caramel or bitter taste that many prunes have which are cooked in water, such as canned or stewed prunes. The ordinary cooking or stewing process is really a leaching process, while the present method is designed to have the opposite effect in that it takes nothing from the prunes, as the long treatment and the low temperature employed causes the prunes to retain all their mineral salts and fruit sugar.

In the present product, due to the comparatively low temperature maintained and the length of time employed, the sugar solution enters the prune slowly, and as the sugar or syrup solution is approximately the same as the sugar solution in the inside of the prune, no leaching effect can take place. Again, due to the comparatively low temperature and length of time required, diffusion takes place slowly, and the danger of bursting the prune is entirely obviated. The long period of treatment also insures tenderness of the skin and pulp of the prune, and ready separation from the pit takes place when it is finally eaten.

One measure of distinction between prunes treated by this process and so-called "candied" prunes or "stewed" prunes is by what is known as the "penetration test".

*Penetration test*

This is a test to determine the relative penetrations of a prune or how much force must be applied to cause a blunt instrument or needle to penetrate the skin of a prune. This force is usually determined in grams and varies with the moisture content of the prune and the treatment to which the skin and pulp of the prune has been subjected.

For instance, a commercial dried prune, when tested for penetration and possessing approximately 25% moisture content, may require a force of up to 290 grams. The ordinary stewed or canned prunes, with a moisture content of approximately 72%, will yield to penetration under a load of from 6 to 22 grams.

A so-called "candied" prune, with a moisture content of approximately 35% would require loading from 50 to 94 grams before the needle will penetrate the prune. On the other hand, prunes treated and preserved according to the present method will possess a moisture content of approximately 46% and will require a load for penetration of from only 10 to 25 grams.

The conclusions drawn from the foregoing comparisons show as a matter of fact that, although the penetration tests for ordinary stewed prunes and for the present process appear to overlap each other, the present method, while resulting in a skin equal in penetrability to that of the stewed prune, has the marked advantage of insuring an unbroken skin as against the burst skin of a stewed prune. Besides, the present method produces a product of greatly reduced moisture content compared with the stewed prune, with a much higher sugar content.

In short, prunes preserved by the present method distinguish not only in appearance, tenderness and flavor over previous methods of treating prunes, but also in firmness, moisture and sugar content.

While the specification describes the preserving of prunes, it should be understood that the method is equally applicable to other dried fruits.

Having thus described my invention, what I claim and desire to secure by Letters Patent is—

1. A method of preserving dried prunes which consists in submerging the prunes in a sugar solution of substantially the same sugar content as that of the dried prunes, maintaining the sugar solution at a temperature of approximately 200° F. for a predetermined period, retaining the prunes in the sugar solution until the flesh and skin has become sufficiently tender to separate from the pit readily and at the same time permitting the sugar solution to cool gradually, removing the prunes from the sugar solution, and then vacuum-packing and sterilizing the prunes.

2. A method of preserving dried prunes which consists in submerging the prunes in a sugar solution of substantially the same sugar content as that of the dried prunes, maintaining the sugar solution and the prunes submerged therein at a temperature of approximately 200° F. for a period of about two hours, retaining the prunes in the sugar solution for an additional period of about sixteen hours and at the same time gradually cooling the prunes and sugar solution to a temperature of approximately 160° F., removing the prunes from the sugar solution, and then vacuum-packing and sterilizing the prunes.

RALPH E. SCHAEFLE.